US010746702B2

(12) United States Patent
Sadeghian Marnani et al.

(10) Patent No.: US 10,746,702 B2
(45) Date of Patent: Aug. 18, 2020

(54) METHOD OF TUNING PARAMETER SETTINGS FOR PERFORMING ACOUSTIC SCANNING PROBE MICROSCOPY FOR SUBSURFACE IMAGING, SCANNING PROBE MICROSCOPY SYSTEM, AND COMPUTER PROGRAM PRODUCT (71) Applicant: Nederlandse Organisatie voor toegepast-natuurwetenschappelijk onderzoek TNO, 's-Gravenhage (NL)

(72) Inventors: Hamed Sadeghian Marnani, 's-Gravenhage (NL); Rutger Meijer Timmerman Thijssen, Loosdrecht (NL); Maarten Hubertus van Es, Voorschoten (NL)

(73) Assignee: Nederlandse Organisatie voor toegepast-natuurwetenschappelijk onderzoek TNO, 's-Gravenhage (NL)

(*) Notice: Subject to any disclaimer, the term of this patent is extended or adjusted under 35 U.S.C. 154(b) by 0 days.

(21) Appl. No.: 16/093,522

(22) PCT Filed: Apr. 13, 2017

(86) PCT No.: PCT/NL2017/050227
§ 371 (c)(1),
(2) Date: Oct. 12, 2018

(87) PCT Pub. No.: WO2017/179977
PCT Pub. Date: Oct. 19, 2017

(65) Prior Publication Data
US 2019/0154636 A1  May 23, 2019

(30) Foreign Application Priority Data

Apr. 14, 2016 (EP) .................... 16165256

(51) Int. Cl.
*G01Q 60/32* (2010.01)
*G01Q 40/00* (2010.01)
(Continued)

(52) U.S. Cl.
CPC ......... *G01N 29/0681* (2013.01); *G01N 29/22* (2013.01); *G01N 29/2418* (2013.01);
(Continued)

(58) Field of Classification Search
CPC ........ G01Q 20/00; G01Q 10/06; G01Q 60/24; G01Q 60/38; G01Q 80/00; G01Q 90/00;
(Continued)

(56) References Cited

U.S. PATENT DOCUMENTS 6,401,519 B1 * 6/2002 McFarland .......... B01J 19/0046
422/68.1
7,448,269 B2 * 11/2008 Shekhawat ........ G01N 29/0663
181/101

(Continued)

OTHER PUBLICATIONS

Hu et al., "Imaging of Subsurface Structures Using Atomic Force Acoustic Microscopy at GHz Frequencies," AIP Journal of Applied Physics 109, 084324, pp. 1-6 (2011).

(Continued)

*Primary Examiner* — David A Vanore
(74) *Attorney, Agent, or Firm* — Leydig, Voit & Mayer, Ltd.

(57) ABSTRACT

Method of tuning parameter settings for performing acoustic scanning probe microscopy for subsurface imaging, scanning probe microscopy system, and computer program product. This document relates to a method of tuning a scanning probe microscopy system. The method comprises: a) applying an acoustic vibration signal comprising a first frequency and a second frequency to a sample; b) at a first position of the probe tip, sweeping the first frequency across a first (Continued)

frequency range, and obtaining a first signal; c) at a second position of the probe tip, sweeping the first frequency across at least said first frequency range, and obtaining a second signal; d) analyzing the first and second signals to obtain a difference characteristic dependent on the first frequency. The first and second position are selected such that a subsurface structure of the sample at the first and second position is different.

20 Claims, 7 Drawing Sheets (51) Int. Cl.
*G01N 29/06* (2006.01)
*G01N 29/22* (2006.01)
*G01N 29/24* (2006.01)
*G01Q 30/04* (2010.01)

(52) U.S. Cl.
CPC ............. *G01Q 30/04* (2013.01); *G01Q 40/00* (2013.01); *G01Q 60/32* (2013.01)

(58) Field of Classification Search
CPC . G01N 2291/02827; G01N 2291/0427; G01N 29/0681; G01N 2291/014; G01N 29/30; G01N 29/348; G01N 29/42; B82Y 35/00; B82Y 30/00

USPC ...................................... 850/21, 1, 32, 40, 9
See application file for complete search history.

(56) References Cited

U.S. PATENT DOCUMENTS

| 8,443,461 B2* | 5/2013 | Ohnesorge ............. G01Q 40/00 73/105 |
| 2003/0041657 A1* | 3/2003 | Degertekin ............ B82Y 35/00 73/105 |
| 2003/0041669 A1* | 3/2003 | Degertekin ........ G01N 29/0681 73/651 |
| 2005/0092907 A1* | 5/2005 | West ...................... G01Q 60/38 250/234 |
| 2008/0276695 A1* | 11/2008 | Prater .................... G01Q 60/32 73/105 |
| 2010/0011471 A1* | 1/2010 | Jesse ...................... G01Q 10/06 850/21 |
| 2011/0231965 A1* | 9/2011 | Passian .................. G01Q 60/32 850/6 |
| 2019/0353681 A1* | 11/2019 | Sadeghian Marnani .................... G01Q 60/34 |

OTHER PUBLICATIONS

Shekhawat et al., "Nanoscale Imaging of Buried Structures via Scanning Near-Field Ultrasound Holography," Science, vol. 310, pp. 89-92 (Oct. 7, 2005).

* cited by examiner

METHOD OF TUNING PARAMETER SETTINGS FOR PERFORMING ACOUSTIC SCANNING PROBE MICROSCOPY FOR SUBSURFACE IMAGING, SCANNING PROBE MICROSCOPY SYSTEM, AND COMPUTER PROGRAM PRODUCT

CROSS-REFERENCE TO RELATED APPLICATIONS

This patent application is a U.S. National Phase of PCT International Application No. PCT/NL2017/050227, filed Apr. 13, 2017, which claims priority to European Application No. 16165256.5, filed Apr. 14, 2016, which are both expressly incorporated by reference in their entireties, including any references contained therein.

FIELD OF THE INVENTION

The present invention is directed at a method of tuning parameter settings for performing acoustic scanning probe microscopy for subsurface imaging using a scanning probe microscopy system. The invention is further directed at a scanning probe microscopy (SPM) system, and at a computer program product therefore.

BACKGROUND

Acoustic scanning probe microscopy methods, such as ultrasonic atomic force microscopy, form a class of imaging and research methods that allows the accurate imaging of subsurface features in a sample. The accuracy and size scale with which this may be performed, are however determined by a number of factors, such as the acoustics underlying the methods performed and the system characteristics (e.g. of the probe and probe tip).

Ultrasonic force microscopy (UFM), is for example performed by applying an ultrasonic signal to the sample (i.e. at MHz range) and modulating the ultrasonic wave with a modulation frequency of approximately the cantilever resonance frequency (i.e. at kHz range). By sensing the output signal at the modulation frequency and analyzing the amplitude and/or phase, subsurface structures can be imaged. This is due to the fact that the high frequency ultrasonic signal is perturbed by the subsurface structures. Information on the subsurface structures is conveyed via these perturbations and becomes measureable in the deflection of the probe tip, i.e. the output sensor signal at the cantilever frequency. However, to obtain an image with optimal contrast—i.e. a good signal to noise ratio—the device parameter settings must be well tuned, which is a difficult process as many parameters depend on each other. Moreover, the parameter settings that provide optimal amplitude contrast, do not necessarily provide optimal phase contrast.

The technology for subsurface imaging may be advantageously applied in industrial settings. For example, in semiconductor fabrication processes, the technology may be applied to perform defect inspection, e.g. of overlay error, alignment error, mask defects or blanks, all causing device defects. As semiconductor device become smaller and smaller, the need for industrialization of imaging techniques such as acoustic scanning probe microscopy methods continues to increase.

SUMMARY OF THE INVENTION

It is an object of the present invention to provide a tuning method that allows fast and efficient tuning of parameter settings for performing subsurface imaging.

To this end, there is provided herewith a method of tuning parameter settings for performing acoustic scanning probe microscopy for subsurface imaging using a scanning probe microscopy system, the system comprising a sample carrier for supporting a sample, and a probe with a probe tip, the system being configured for positioning the probe tip relative to the sample, a transducer, a sensor for sensing probe tip vibrations, and a controller; wherein the method comprises the steps of: a) applying, by the transducer, an acoustic vibration signal comprising a first frequency and a second frequency to the sample; b) at a first position of the probe tip relative to the sample, controlling the transducer to sweep the first frequency of the acoustic vibration signal across a first frequency range, and obtaining a first probe tip sensor signal using the sensor during said sweeping; c) at a second position of the probe tip relative to the sample, controlling the transducer to sweep the first frequency of the acoustic vibration signal across at least said first frequency range, and obtaining a second probe tip sensor signal using the sensor during said sweeping; and d) analyzing, by the controller, the first and second sensor signal to obtain a difference characteristic dependent on the first frequency, and selecting a first frequency value for which the difference characteristic exceeds a threshold for tuning the first frequency; wherein the first and second position are selected such that a subsurface structure of the sample at the second position is different from the subsurface structure of the sample at the first position.

In accordance with the present invention the first frequency is swept across the first frequency range in at least two locations: at the first location the sample has a different internal structure than at the second location. For example, the first and second locations may be carefully selected such that a subsurface reference structure may be known to be present in one location which is known to be absent in another location. The difference characteristic may be a difference in amplitude or a difference in phase of the output signal, or any other parameter that allows to relate the sensor signal to the obtainable contrast. In particular, the difference characteristic is provided dependent on the first frequency. From this, the first frequency value may be selected in step d) for which the difference characteristic provides maximum contrast, or for which the contrast provided matches a certain (e.g. preselected or predefined) minimum level. This latter may be indicated by a threshold value against which the difference characteristic may be compared: if the difference characteristic exceeds the threshold, the contrast level will be sufficient for that first frequency value.

In accordance with some embodiments, a setpoint setting of the system defines a force applied by the probe tip to a surface of the sample during sensing, the method further comprising repeating of steps b), c) and d) for a plurality of different setpoint settings, and for said tuning, selecting a setpoint setting and an associated first frequency value for which the difference characteristic exceeds a threshold. In particular, the setpoint of the scanning probe microscope may be set subsequently to a number of different values, and the steps b), c) and d) above may be repeated for each of these to obtain a first frequency dependent difference characteristic for each setpoint value. Then, for example, a maximum contrast level at each setpoint may for example be determined at a particular first frequency value associated with that setpoint; and from these values the setpoint and first frequency value combination providing maximum contrast (based on the difference characteristic) may be selected as parameter setting. Again, the parameter combination and ranges for which the expect contrast based on the difference characteristic exceeds a predetermined threshold level may alternatively be determined and stored.

In accordance with some further embodiments, the method further comprises the steps of: e) at said first position, controlling the transducer to sweep the second frequency of the acoustic vibration signal across a second frequency range, and obtaining a third probe tip sensor signal using the sensor during said sweeping; f) at said second position, controlling the transducer to sweep the second frequency of the acoustic vibration signal across at least said second frequency range, and obtaining a fourth probe tip sensor signal using the sensor during said sweeping; and g) analyzing, by the controller, the third and fourth sensor signal to obtain a difference characteristic dependent on the second frequency, and selecting a second frequency value for which the difference characteristic exceeds a threshold for tuning the second frequency. In some embodiments, the sweeping across each of the first and second frequency ranges for respectively the first and second frequency, may be performed in one go. For example, at a given location, at each of a plurality of discrete first frequency values, the second frequency may be swept across the second frequency range. This may be done for a plurality of setpoints. The order in which these frequency sweeping steps are performed may be different depending on preferences, without departing from the invention as described herein.

In accordance with some further embodiments, steps b) and c) are performed by: scanning the probe tip relative to the sample; and at a plurality of relative positions between the probe tip and the sample during said scanning, controlling the transducer to sweep the first frequency of the acoustic vibration signal across the first frequency range, and obtaining a probe tip sensor signal for each of the plurality of relative positions using the sensor during said sweeping; further comprising a step of identifying from the plurality of relative positions or the associated probe tip sensor signals, a first group of positions and a second group of positions such that the subsurface structure of the sample at the second group of positions is different from the subsurface structure of the sample at the first group of positions; wherein step d) is performed by analyzing, by the controller, the sensor signals associated with the first group of positions in relation to the sensor signals associated with the second group of positions to obtain the difference characteristic dependent on the first frequency, and selecting the first frequency value for which the difference characteristic exceeds the threshold for tuning of the first frequency. One possible embodiment, for example, performs a line scan or area scan across a part of the sample, and identifies a first plurality of locations wherein a subsurface structure is absent—thereby forming the first group—and a second plurality of locations wherein a subsurface structure is present—thereby forming the second group. Performing the tuning across a plurality of locations categorized in a first and second group, provides a better measurement statistic for performing optimal tuning. On the other hand, the advantage of restricting the measurement to two locations is that this results in less wear of the probe tip of the scanning probe microscope, and makes it possible to carry out the method quickly to thereby reduce the tuning time.

In accordance with further embodiments, steps e) and f) are performed by: at said plurality of relative positions between the probe tip and the sample during said scanning, controlling the transducer to sweep the second frequency of the acoustic vibration signal across the second frequency range, and obtaining a further probe tip sensor signal for each of the plurality of relative positions using the sensor during said sweeping; wherein step g) is performed by analyzing, by the controller, the sensor signals associated with the first group of positions in relation to the sensor signals associated with the second group of positions to obtain the difference characteristic dependent on the second frequency, and selecting the second frequency value for which the difference characteristic exceeds the threshold for tuning of the second frequency.

In some of the above embodiments, the step of sweeping of the second frequency at the plurality of relative positions between the probe tip and the sample, and obtaining the further probe tip sensor signal for each position is performed during a further step of scanning of the probe tip relative to the sample. For example, first the first frequency and the setpoint may be tuned, and then an optimization is performed for the second frequency.

In accordance with some further embodiments, at least one of the step of scanning or the further step of scanning is performed by scanning in a first direction and scanning in a second direction, the second direction being a counter direction of the first direction. For some subsurface topographies, the contrast obtained from the sensor signal may be different dependent on the scanning direction of the probe. Therefore, advantageously, the parameters may be optimally tuned for both scanning directions (i.e. to provide sufficient contrast in both directions), or even different parameter settings may be applied dependent on the scanning direction after optimizing in both directions and storing the optimal parameter tuning for both directions.

In accordance with various embodiments, at least one difference characteristic obtained in either one or both of steps d) and g) includes at least one element of a group comprising: an amplitude difference between the first and second sensor signals, a phase difference between the first and second sensor signals, and a contrast parameter of the amplitude difference between the first and second sensor signal (wherein the contrast parameter value quantifies or is representative of the contrast obtained by the amplitude difference, such as a Weber contrast value), or a combination of these characteristics. Weber contrast is defined as the difference in a certain parameter to be measured (e.g. the amplitude or the phase of the output signal) divided by the average of the respective parameter at a location without subsurface structural features. For example, the amplitude contrast is the average amplitude in the first location (e.g. wherein a subsurface feature is present) minus the average amplitude in the second location (e.g. wherein a subsurface feature is absent) divided by the average amplitude in the second location. The phase contrast may be calculated by taking the difference between the average phase at the first location and the average phase at the second location.

The method of the present invention may be applied to various acoustic scanning probe microscopy methods for subsurface imaging, wherein a plurality of frequency values and other parameters is to be optimized. For example, the present tuning method may be applied for tuning parameter settings such as to perform ultrasonic force microscopy (UFM) as described above. In that case, suitable ranges for sweeping the first and second frequency values may be as follows. The first frequency range for such applications may comprises frequencies between 10 Hz to 10 GHz. Moreover, the second frequency range may comprise frequencies between 0 MHz and 300 MHz, preferably 1 MHz to 200 MHz, more preferably 2 MHz to 150 MHz. The claimed invention may however likewise be applied to perform heterodyne force microscopy (HFM), wherein a high frequency acoustic signal is mixed with a slightly offset frequency such as to provide a signal component at the much lower difference frequency between the high frequency component and the offset frequency.

In accordance with a second aspect, there is provided a method of performing acoustic scanning probe microscopy for subsurface imaging using a scanning probe microscopy system, the system comprising a sample carrier for supporting a sample, and a probe with a probe tip, the system being configured for positioning the probe tip relative to the sample, a transducer, a sensor for sensing probe tip vibrations, and a controller; wherein the method comprises a method of tuning parameter settings in accordance with any of the claims 1-10, further comprising a steps of: scanning the probe tip relative to the sample; applying, by the transducer, an acoustic vibration signal comprising a first frequency and a second frequency to the sample; and obtaining a responsive probe tip sensor signal using the sensor for providing an output signal for said subsurface imaging of the sample.

In accordance with a third aspect, there is provided a scanning probe microscopy system configured for performing automatic tuning of parameter settings for acoustic scanning probe microscopy for subsurface imaging, the system comprising a sample carrier for supporting a sample, a probe with a probe tip, a transducer, a sensor for sensing probe tip vibrations, a memory and a controller, wherein the system is configured for positioning the probe tip relative to the sample, and wherein the controller is configured for: a) applying, by controlling the transducer, an acoustic vibration signal comprising a first frequency and a second frequency to the sample; b) at a first position of the probe tip relative to the sample, controlling the transducer to sweep the first frequency of the acoustic vibration signal across a first frequency range, and obtaining a first probe tip sensor signal using the sensor during said sweeping; c) at a second position of the probe tip relative to the sample, controlling the transducer to sweep the first frequency of the acoustic vibration signal across at least said first frequency range, and obtaining a second probe tip sensor signal using the sensor during said sweeping; d) analyzing, by the controller, the first and second sensor signal to obtain a difference characteristic dependent on the first frequency, and selecting a first frequency value for which the difference characteristic exceeds a threshold for tuning the first frequency; wherein the controller is further configured for selecting the first and second position such that a subsurface structure of the sample at the second position is different from the subsurface structure of the sample at the first position.

Furthermore, in accordance with some embodiments, the setpoint setting of the system defines a force applied by the probe tip to a surface of the sample during sensing, and wherein the controller is further configured for repeating of steps b), c) and d) for a plurality of different setpoint settings, and for performing said tuning by selecting a setpoint setting and an associated first frequency value for which the difference characteristic exceeds the threshold.

In accordance with some further embodiments, the controller is further configured for: e) at said first position, controlling the transducer to sweep the second frequency of the acoustic vibration signal across a second frequency range, and obtaining a third probe tip sensor signal using the sensor during said sweeping; f) at said second position, controlling the transducer to sweep the second frequency of the acoustic vibration signal across at least said second frequency range, and obtaining a fourth probe tip sensor signal using the sensor during said sweeping; and g) analyzing, by the controller, the third and fourth sensor signal to obtain a difference characteristic dependent on the second frequency, and selecting a second frequency value for which the difference characteristic exceeds a threshold for tuning the second frequency.

In accordance with a third aspect, there is provided a computer program product, conveyed on a computer readable medium or by a signal, the product comprising instruction for operating a controller of a scanning probe microscopy system when provided to the controller, such as to enable the controller to perform a method of tuning parameter settings of the scanning probe microscopy system for performing acoustic scanning probe microscopy for subsurface imaging in accordance with the first aspect.

BRIEF DESCRIPTION OF THE DRAWINGS

The invention will further be elucidated by description of some specific embodiments thereof, making reference to the attached drawings. The detailed description provides examples of possible implementations of the invention, but is not to be regarded as describing the only embodiments falling under the scope. The scope of the invention is defined in the claims, and the description is to be regarded as illustrative without being restrictive on the invention. In the drawings:

DETAILED DESCRIPTION

Figure 1:
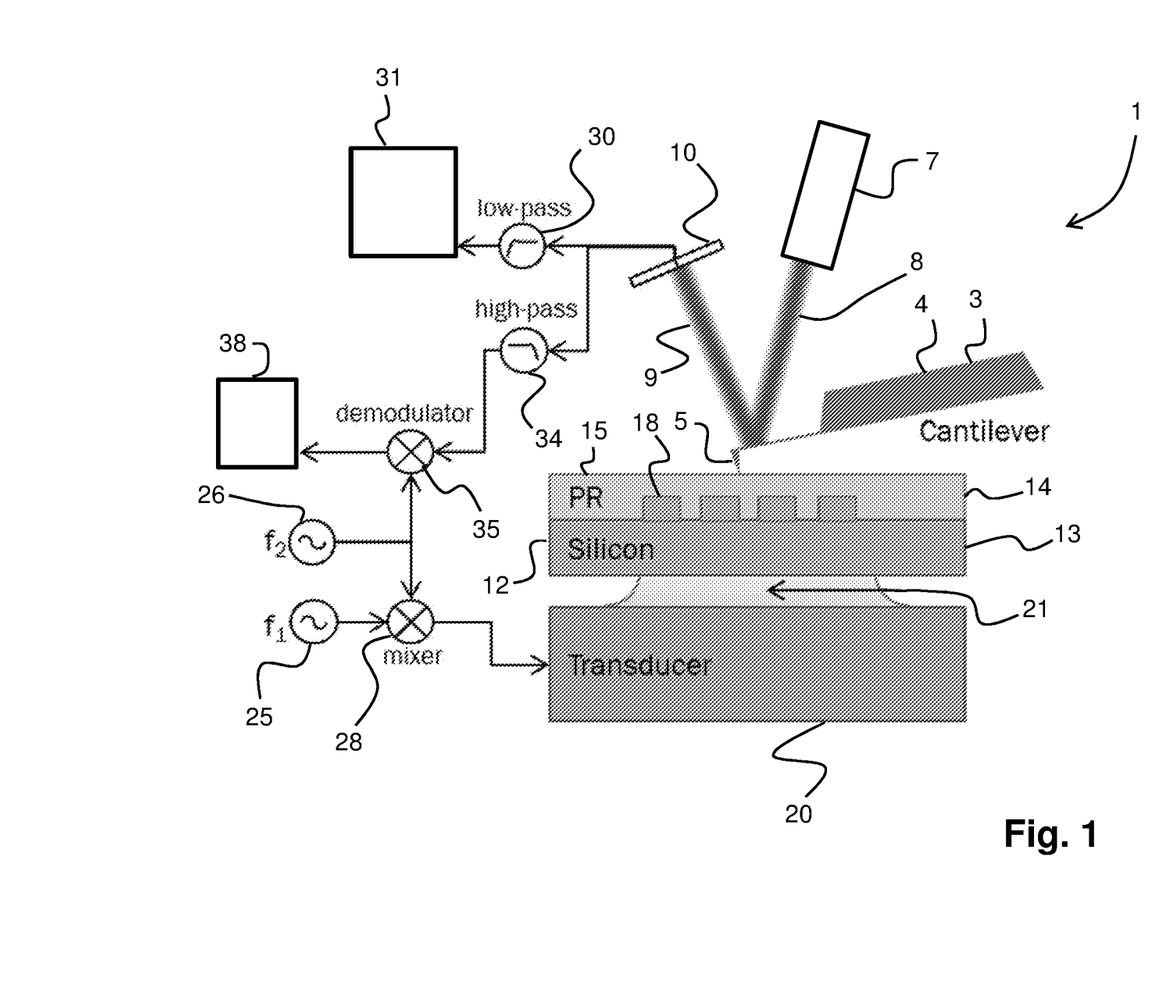
FIG. 1 schematically illustrates a scanning probe microscopy system in accordance with an embodiment of the present invention.

FIG. 1 schematically illustrates a scanning probe microscopy system (SPM) 1, in accordance with an embodiment of the present invention. The system 1 comprises a probe 3 having a cantilever 4 and a probe tip 5. The probe tip 5 is brought in contact with a surface 15 of a sample 12. A light source 7, typically a laser, provides an optical signal beam 8 that is incident on the back of the probe tip 5. A reflected optical beam 9 is received by an optical sensor 10. Any vibration of the probe tip 5 perpendicular to the surface 15 of the sample 12 will result in a deflection of the reflected optical beam 9. This deflection can be accurately determined by means of optical sensor 10 which provides an (electrical) sensor signal for further analysis.

Acoustic scanning probe microscopy methods typically apply an acoustic signal to a sample, which results in acoustic vibrations at the sample surface. These vibrations may be sensed by a probe tip of an SPM system with great accuracy. In the system 1 of FIG. 1, a transducer 20 is arranged underneath the sample 12. A coupling medium 21 (e.g. a liquid, an oil or grease (e.g. vaseline)) provides a low resistance coupling between the acoustic transducer 20 and the sample 12. This allows an acoustic signal produced by the transducer 20 to penetrate the sample 12 from the back side thereof, e.g. in as in the set-up illustrated in FIG. 1. In respect of this, it is noted that it is not essential to the invention to apply the acoustic signal from the back side of the sample. The transducer for applying an acoustic signal may be located elsewhere relative to the sample, enabling the acoustic signal to be applied from any desired direction (e.g. above, below, from aside, or even through another part or entity). The sample 12 in FIG. 1 consists of a silicon carrier layer 13, some optional device layers (not shown) providing internal structures 18 of the device, and a photo-resist (PR) layer 14. The surface 15 of the sample 12 in the example illustrated in FIG. 1, is the upper surface of the photo resist layer 15. As may be appreciated, the sample illustrated in FIG. 1 (and also the samples illustrated in other figures throughout this document) are merely examples, and application of the invention is not restricted to these illustrated samples.

The acoustic signal provided by transducer 20, after penetrating the sample 12, is conveyed through the layers 13 and 14 producing acoustic vibrations at the surface 15. These can be sensed by the probe tip 5. By scanning the probe 3 relative to the surface 15 of the sample, such that the probe tip 5 follows a path on the surface 15 of the sample 12, sub-surface structures 18 within the sample 12 can be detected by analysis of the sensor signal provided by optical sensor 10 (e.g. a photodiode).

The acoustic signal to be provided via the transducer 20 to the sample 12 consists of a high frequency component $f_1$ and low frequency component $f_2$, and is created as follows. A high frequency input signal component $f_1$ 26 and a low frequency input signal component $f_2$ 25 are mixed by mixer 28 and provided to the transducer 20. The transducer 20, via the coupling medium 21 (which in the present example may be Vaseline), sends the acoustic signal into the silicon carrier layer 13 of the sample 12. The sensor signal from optical sensor 10 is provided to a low-pass filter 30 for contact mode feedback, and the output of the low-pass filter 30 is sent to SPM controller 31. The low pass filter has a cutoff frequency of, for example, around 2 kHz. This is fast enough with respect to the scanning speed, but only slightly higher than the sampling rate (e.g. 1024 pixels in 1 second corresponds to a sampling rate of 1.024 kHz). SPM controller 31 uses the feedback signal to maintain the SPM system fixed at its set-point. The sensor signal from the optical sensor 10 is further provided to a high-pass filter 34. The high pass filter 34 also has a cutoff frequency of, for example, around 2 kHz, thus thereby transmitting the sensor signal including the low frequency ultrasound signal (i.e. including component $f_2$) to the demodulator 35. The high frequency ultrasound input signal component (i.e. including component $f_1$) is too fast to be measured by the optical sensor 10 and is not used. The demodulator 35 further receives the low frequency input signal $f_2$ 26 as a reference signal, and an output signal of the demodulator is provided to analysis system 38 which allows to analyze the location dependent ultrasound output signal to identify the location of the subsurface structures 18.

As may be appreciated, the method and system described above are not limited to a specific type of sample, but may be implied in combination with any fact of sample for detecting subsurface structures, such as density variations, different materials, hidden features, cavities, and the like.

Figure 2:
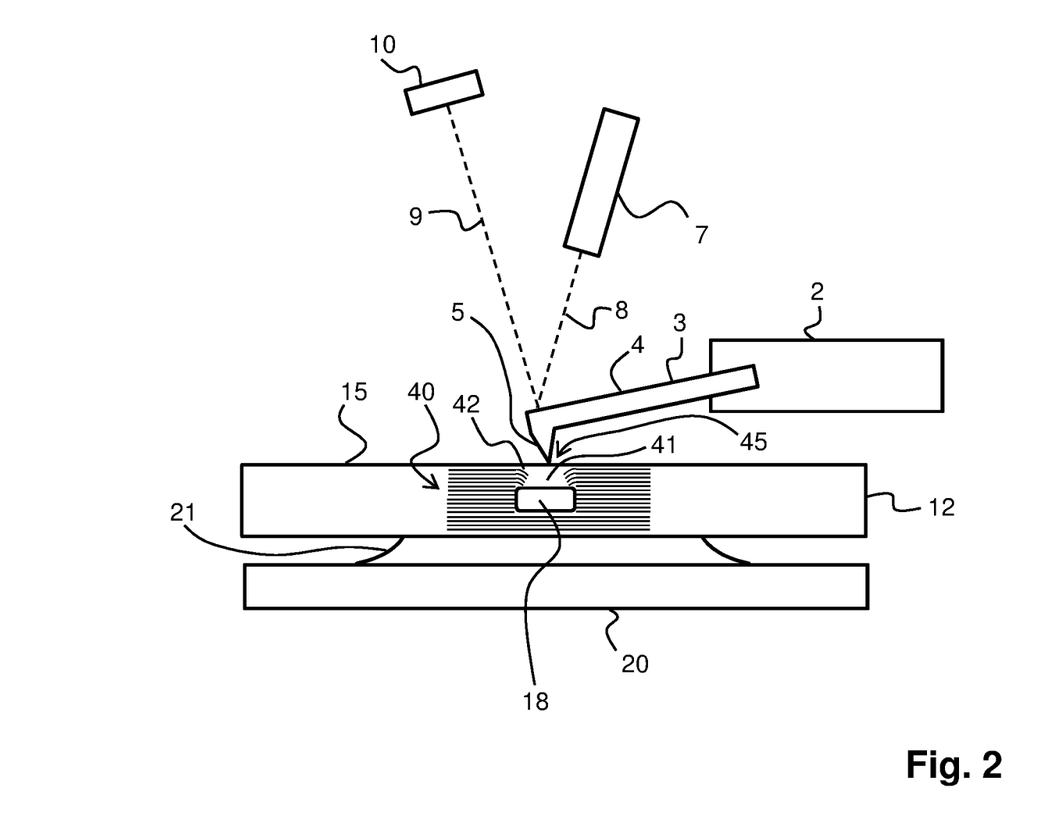
FIG. 2 schematically illustrates application of an acoustic signal on a sample in an embodiment of the present invention.

The system of FIG. 1 is again schematically illustrated in FIG. 2. FIG. 2 illustrates the sensor head 2 comprising the probe 3 and cantilever 4 with probe tip 5. The transducer 20 in FIG. 2 provides an acoustic output signal schematically indicated by reference numeral 40. FIG. 2 illustrates the sample 12 to comprise a subsurface element 18. The acoustic signal 40 enters the sample from back side contiguous to the transducer 20 and coupling medium 21. The acoustic signal encounters the subsurface structures 18, which forms a barrier that disturbs the acoustic signal pattern downstream. As illustrated in FIG. 2, the presence of a subsurface element 18 causes the stiffness of the material in area 41 to be different from elsewhere in sample 12. Through the probe tip 5, the cantilever 4 probes the stiffness of the sample 12. The sample stiffness together with the cantilever stiffness form an effective stiffness which determines the cantilever's contact resonances. Changes in the sample stiffness change the effective stiffness, thereby changing the cantilever contact resonances. These resonances are probed by the ultrasound waves. The ultrasound is mixed by the non-linear tip-surface interaction between the probe tip 5 and the surface 15 of the sample 12, creating physical movement of the cantilever 4 at the lower frequency of the frequencies, which is probed by the optical deflection system.

However in other areas, such as location 45 illustrated in FIG. 2, the amplitude of the acoustic signal at or near the ultrasound frequency may be lower. This allows to detect the location of the subsurface elements by measuring the amplitude of the acoustic signal. However, the location of the subsurface elements may also be determined by analysis of the phase of the acoustic signal detected.

The contrast obtained in the output signal is largely dependent on a number of parameters that can be tuned in the scanning probe microscopy system. One of these particular parameters for example is the setpoint of the system. In scanning probe microscopy systems (e.g. an atomic force microscope), the setpoint is representative of the force exerted by the probe tip 5 on the sample surface 15 (e.g. in contact mode). In contact mode, this force is determined by the deflection of the cantilever 4, whereas in tapping mode the amplitude of the probe tip 5 is representative of the force with which the tip taps on the sample. As will be appreciated, pressing the probe 3 harder on to the surface will provide a better coupling between the sample surface 15 and the probe tip 5, causing the acoustic signals to be transferred more easy onto the probe tip. However, above a given setpoint when the force between probe tip 5 and the sample surface 15 is further increased, this will have little or no effect on the detectability of the acoustic signal. On the other hand, making the force between probe tip 5 and the sample surface 15 too large will cause more damage to both the probe tip 5 and the sample surface 15 during the scanning of the probe 3 across the sample surface. Hence, there will be an optimal value for the setpoint for detecting acoustic signals while keeping damage to the probe 3 and sample 12 to a minimum.

Another parameter to be tuned is the low frequency acoustic signal $f_2$. The optimum frequency will be dependent on the material of choice and typically may be set dependent on this material. As will be appreciated, the acoustic properties of the sample will enable some frequencies to be conveyed well through the sample, while other frequencies may be suppressed or less well conveyed. During tuning of parameters, a frequency is to be determined that provides sufficient contrast in the output signal from the optical sensor. This is not straightforward, because the optimal value for the low frequency may be different dependent on whether amplitude, phase, or (as is frequently desired) both are to be measured.

As a third parameter, the frequency of the high frequency component $f_1$ of the acoustic signal must be tuned. Higher frequencies have shorter wavelengths, allowing smaller elements to be better detectable. However, also in this high frequency range some frequencies are conveyed better by the material than other frequencies, and therefor the contrast in the output signal largely varies dependent on the high frequency applied. Again, this is also dependent on whether amplitude or phase are measured.

As mentioned, the level of contrast between areas where no subsurface elements are present and areas wherein subsurface elements such as elements 18 are present, further depends on whether the phase or the amplitude is measured. For some combinations of a setpoint, a low frequency and a high frequency value, the amplitude contrast will be excellent such as to provide a large signal-to-noise ratio (SNR), while for the same parameter settings, the phase contrast may be insufficient. Therefore, to provide an acceptable signal-to-noise ratio both with respect to the amplitude as with respect to the phase of the output signal, optimization of the tuning parameters for both these characteristics of the output signal (phase and amplitude) is desired. The present invention provides a method of performing this optimization in an automated manner.

Figure 3:
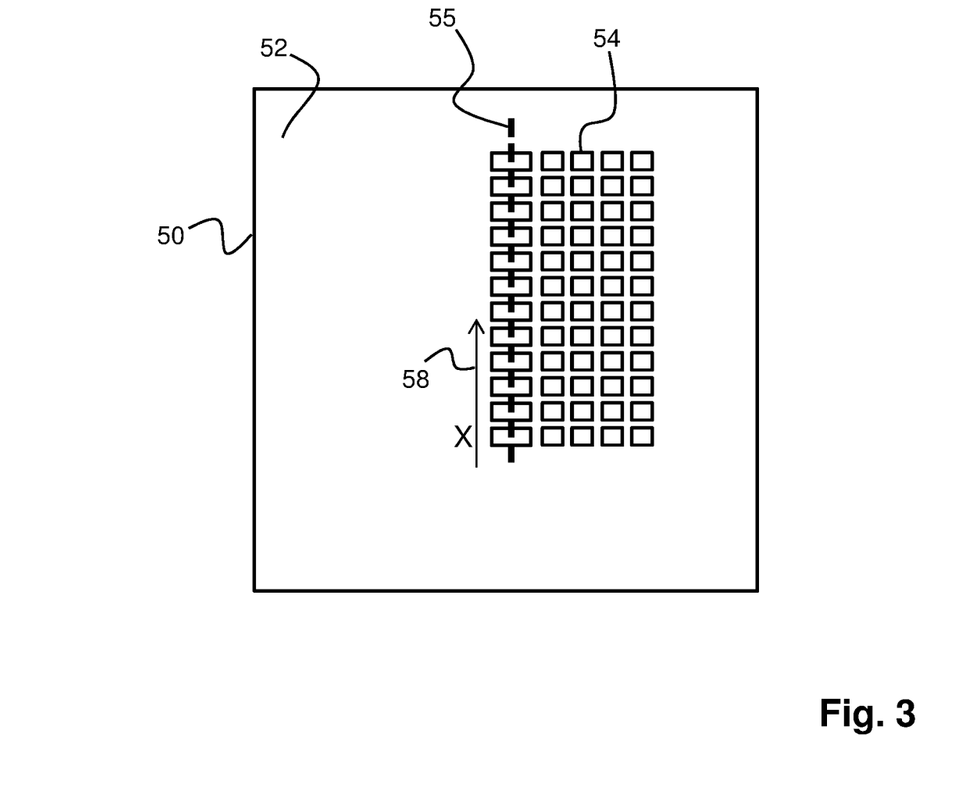
FIG. 3 schematically illustrates a sample used in the example described in FIGS. 4a-4e.
Figure 4A:
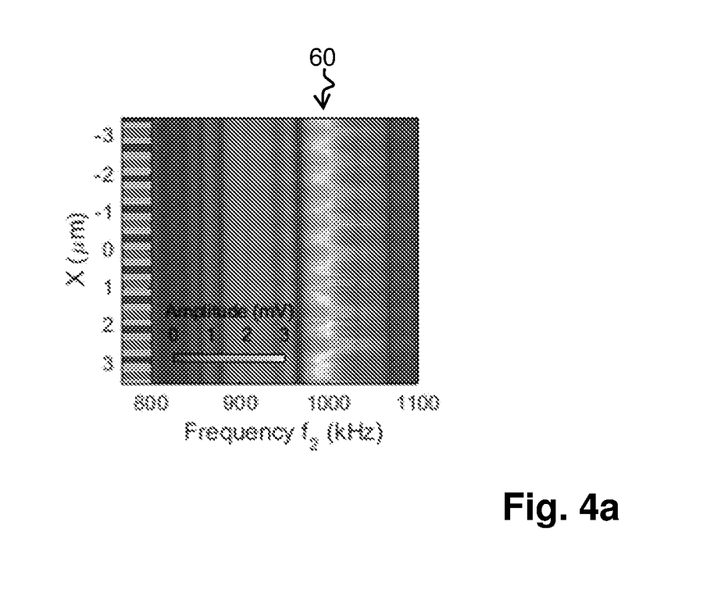
FIGS. 4a-4e provides an example of a method of tuning parameter settings in accordance with the present invention.

FIG. 3 schematically illustrates a sample 50 having a sample surface 52. Also illustrated in FIG. 3 are the locations of a plurality of subsurface elements 54. A sample 50 such as illustrated in FIG. 3 is used for calibrating an atomic force microscopy system in accordance with the present invention. To this end, the probe of the atomic force microscopy (AFM) system is scanned across the surface following path 55. Arrow 58 in FIG. 3 illustrates the x-direction referred to in the FIGS. 4a-4e below. Further reference is made to the example method illustrated in FIG. 5 schematically.

The calibration method starts by setting a setpoint value in the AFM system, and performing a scan across the line 55 in FIG. 3. The scan across the line 55 is performed at a plurality of different frequency settings for the low frequency component $f_2$. Alternatively, if only a single scan across line 55 is desired, the probe may be scanned stepwise across the surface, and at each location the frequency may be varied across the range of frequencies $f_2$ to be measured. The data obtained from this measurement is illustrated in FIG. 4a. On the vertical axis the location x in μm across the path 55 is illustrated. On the horizontal axis the low frequency value setting $f_2$ (in kHz) is illustrated. The amplitude values sensed at each frequency setting are illustrated in the graph of FIG. 4a. As may be appreciated, this may also be done for the phase values sensed, which is not illustrated here in order not to unnecessary complicate the example. Clearly, larger amplitudes are detected in the range around 1000 kHz, generally indicated by arrow 60 in FIG. 4a.

Figure 4B:
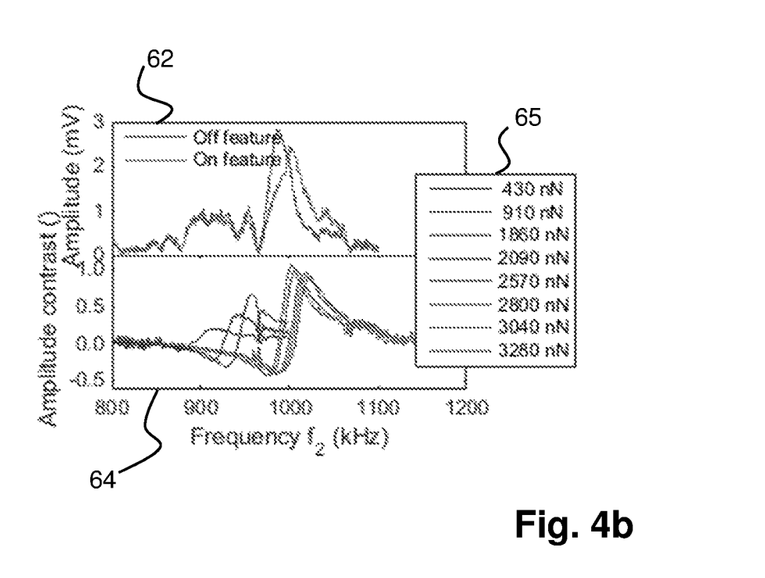
Figure 5:
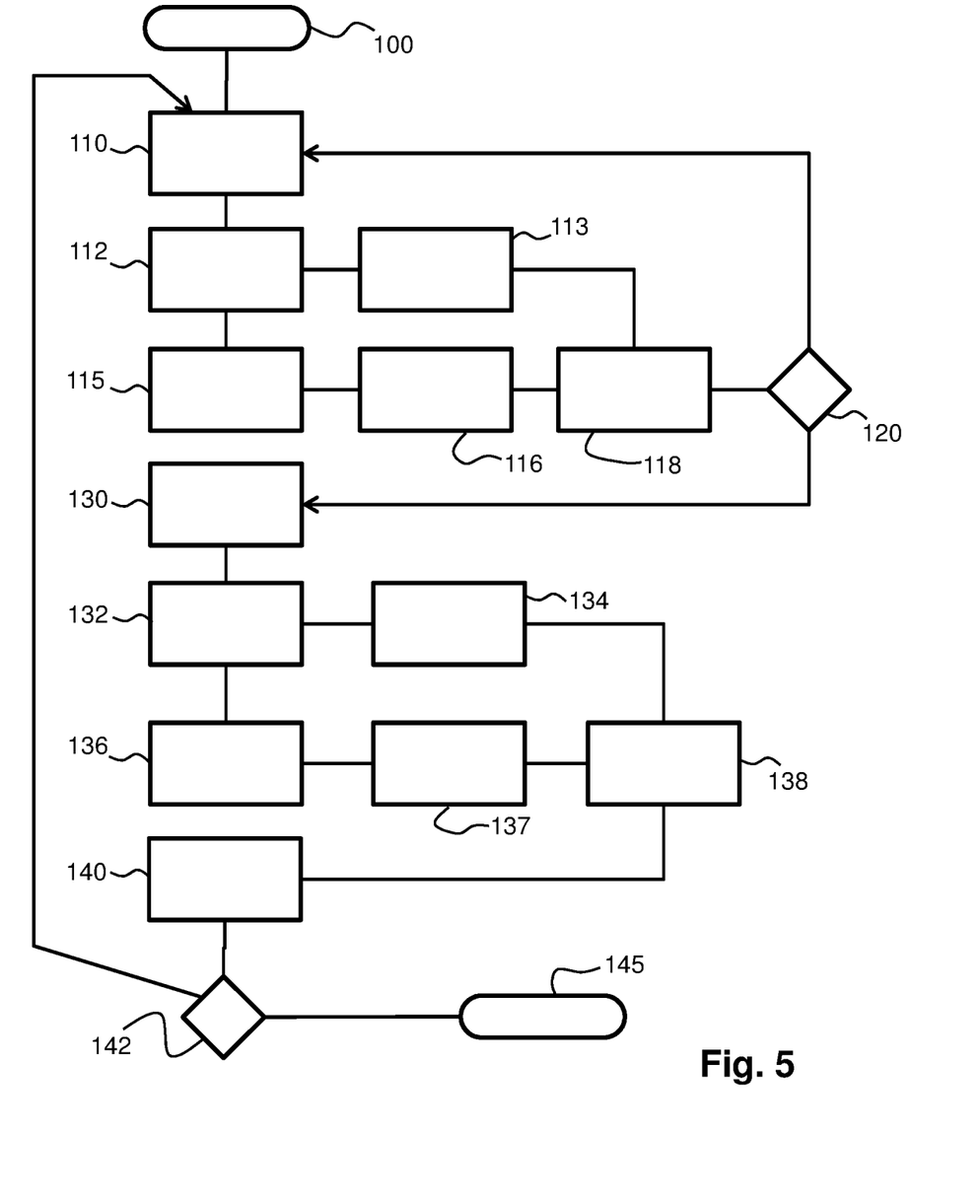
FIG. 5 schematically illustrates the method in accordance with an embodiment of the present invention.

FIG. 4b, the upper part 62 thereof, is a graph illustrating the amplitude values for a typical x value on the path 55 located on or above the subsurface feature 54 and another area located there where no subsurface features are present (off feature). The lower part of the graph 64 in FIG. 4b illustrates the amplitude contrast (calculated as Weber contrast) at a plurality of different setpoint settings of the AFM system. The amplitude contrast can be measured by comparison of the on-feature value with the off-feature value at each frequency of the graph in the upper part 62 of FIG. 4b. If this is performed for a plurality of setpoints, from the amplitude difference obtained at each frequency setting for $f_2$, the amplitude contrast can be calculated using for example the well known Weber contrast formula:

$$C_{w\_A} = (A_{on\_feature} - A_{off\_feature})/A_{off\_feature}$$

Here $C_{w\_A}$ is the Weber contrast value for the measured amplitude, $A_{on\_feature}$ is the average on-feature amplitude and $A_{off\_feature}$ is the average off-feature amplitude. It is to be understood, however, that other contrast parameters may be applied (i.e. parameters that are indicative of the level of contrast or that quantify the level of contrast).

Figure 4C:
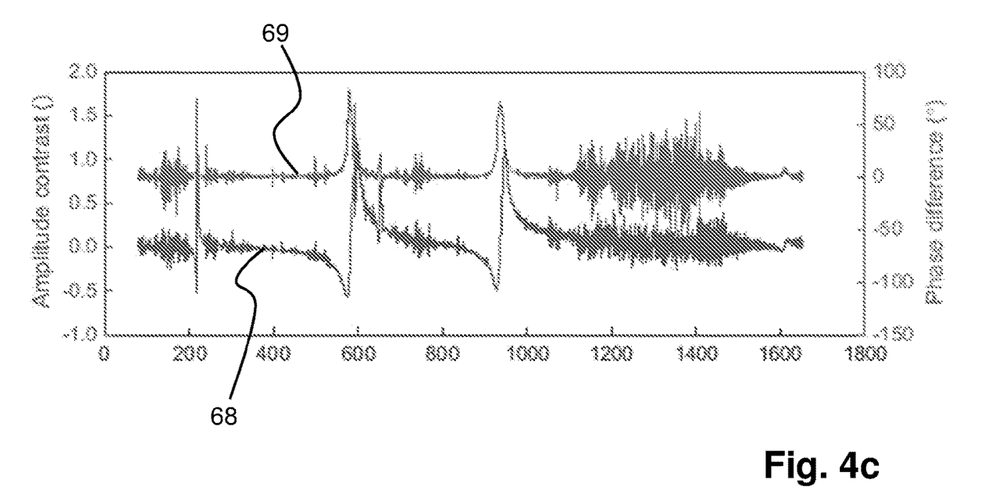

A similar measurement and calculation can be performed for the phase of the signal at each frequency, and FIG. 4c schematically illustrates both the amplitude contrast and the phase difference obtainable from such measurements. From these measurements, a first combination of the setpoint setting and the low frequency component $f_2$ can be selected that provides an acceptable signal-to-noise ratio for both the amplitude and the phase of the output signal.

Figure 4D:
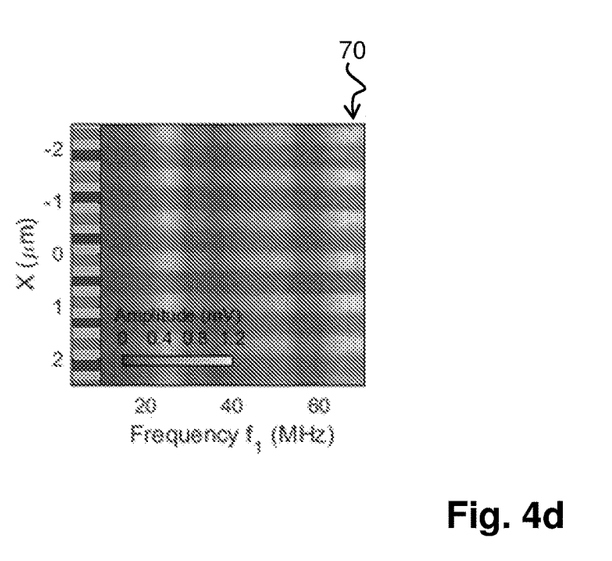
Figure 4E:
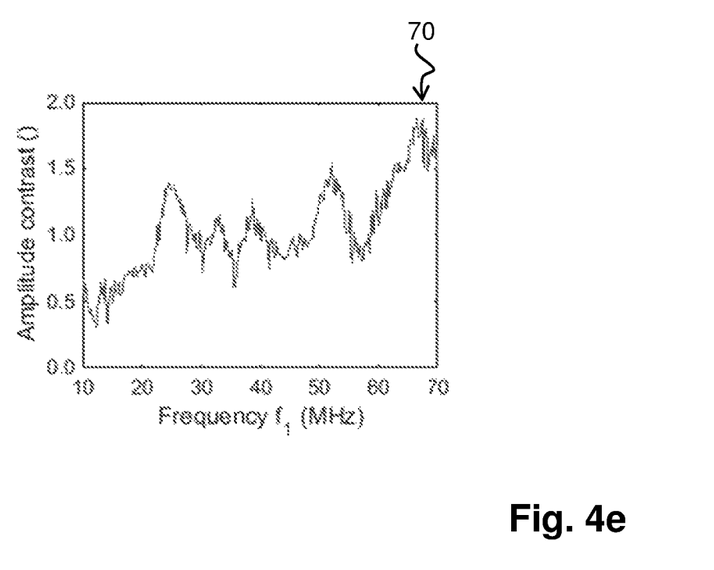

Next, as illustrated in FIG. 4d, scanning of the sample across the line 55 with the probe tip 5 of the AFM system can be repeated for a plurality of high frequency settings $f_1$. The results of the scan are illustrated in FIG. 4d providing the frequency $f_1$ on the horizontal axis and the location x on the vertical axis. Clearly, in the frequency range generally indicated by reference numeral 70, the output signal has a very good signal-to-noise ratio. FIG. 4e is an illustration of the amplitude contrast for each frequency $f_1$, obtained from the data in FIG. 4d. From this data, the optimal frequency $f_1$, can be selected and set in the system. Together with the already determined combination of the setpoint setting and the low frequency component $f_2$, the determined optimum value for the high frequency component $f_1$ provides the tuned set of parameters for the system that can be used for during operation of the system.

FIG. 5 schematically illustrates an overview of the method steps for an embodiment of the present invention. The method starts at 100. In step 110, a setpoint setting is set into the AFM or SPM system 1 as described herein above. Next, the frequency $f_2$ is set at a starting value at step 112. In step 113, the probe is scanned across the surface using the current setpoint setting and current frequency $f_2$. The steps 112 and 113 may be repeated for a plurality of different settings of $f_2$. For example, step 112 may include stepping the frequency $f_2$ towards a next frequency value to be sensed. The measurement data obtained from the scanning step 113 and the frequency settings 112 are stored in memory. The scanning in step 113 is performed in forward mode, for example with an increasing x position value during scanning (e.g. in FIG. 3 in the direction indicated by arrow 58). Optionally, in step 115 and 116 the same method may be performed in a backward or reverse scanning mode. This is the counter direction of the direction illustrated in FIG. 3 by arrow 58. These scans, performed in forward and backward direction, are also known as trace and retrace of the scan path. During this retrace step, the frequency $f_2$ is again set or stepped in step 115, and the scanning in the backward direction is performed in step 116. As will be appreciated, the exact order in which steps 112 and 113 and optional steps 115 and 116 are performed, and whether some steps are performed simultaneously (e.g. the frequency $f_2$ may be varied during scanning by performing the scanning stepwise), may be different in different embodiments.

Next in step 118, the measurements from the trace and retrace scans are collected such as to allow selecting of a frequency $f_2$ during a later step. The measurement data may be stored in a memory of the system, or in a different data repository or storage medium. In decision step 120, it is decided whether or not a further setpoint value has to be set by the system. In case a further setpoint is to be set, the method continues again in step 110. Otherwise the method will continue in step 130.

In step 130, an optimal combination of a setpoint and a frequency $f_2$ of the low frequency component is selected based on the data collected from all scans. Next, in step 132 the method continues for optimizing the high frequency component $f_1$. Again, this consists of setting a high frequency value $f_1$ or stepping the frequency value $f_1$ in step 132, and performing a forward scan in step 134. The steps 132 and 134 may be repeated for a plurality of different frequencies $f_1$. The data may be collected in step 138. Optionally, the same is performed for a backward scanning for retrace in steps 136 and 137. The frequency may be set/stepped again in step 136, and the scanning may be performed in step 137. As will be appreciated, the exact order in which steps 132 and 134 and optional steps 136 and 137 are performed, and whether some steps are performed simultaneously (e.g. the frequency $f_1$ may be varied during scanning by performing the scanning stepwise), may be different in different embodiments.

Also this data is collected in step 138, and the optimal value for the frequency $f_1$ of the high frequency component is selected in step 140. This yield the optimal combination of the low frequency $f_2$, high frequency $f_1$, and the setpoint value of the system. Optionally, as indicated by decision step 142, the method may be repeated a plurality of time by restarting again in step 110. Measuring multiple times provides additional statistics, thereby potentially improving the calibration. However, in case this is not necessary or in case no further measurements are required, the method ends in step 145.

Throughout this document, reference is made to the 'first frequency' and the 'second frequency'. Moreover, in the detailed description, further reference is made to a 'high frequency component' parameter $f_1$ and a 'low frequency component' parameter $f_2$. The parameters $f_1$ and $f_2$, although including the subscripts '1' and '2', do not particularly relate respectively to a particular one of the 'first' and the 'second' frequencies as referred to in the claims. In the appended claims, the wording 'first frequency' and 'second frequency' is merely used to indicate a frequency and another frequency, i.e. to distinguish between frequencies mentioned in the claims, without intending to refer to any of the example parameters that are discussed in the embodiments. In other words, the scope of the claims is defined by the wording of the claims. The nomenclature of parameters in the detailed description should not be interpreted narrowly in that respect. Hence, in other embodiments, a high frequency component may be referred to by a different parameter, without departing from the claimed invention.

The present invention has been described in terms of some specific embodiments thereof. It will be appreciated that the embodiments shown in the drawings and described herein are intended for illustrated purposes only and are not by any manner or means intended to be restrictive on the invention. It is believed that the operation and construction of the present invention will be apparent from the foregoing description and drawings appended thereto. It will be clear to the skilled person that the invention is not limited to any embodiment herein described and that modifications are possible which should be considered within the scope of the appended claims. Also kinematic inversions are considered inherently disclosed and to be within the scope of the invention. In the claims, any reference signs shall not be construed as limiting the claim. The term 'comprising' and 'including' when used in this description or the appended claims should not be construed in an exclusive or exhaustive sense but rather in an inclusive sense. Thus the expression 'comprising' as used herein does not exclude the presence of other elements or steps in addition to those listed in any claim. Furthermore, the words 'a' and 'an' shall not be construed as limited to 'only one', but instead are used to mean 'at least one', and do not exclude a plurality. Features that are not specifically or explicitly described or claimed may be additionally included in the structure of the invention within its scope. Expressions such as: "means for . . . " should be read as: "component configured for . . . " or "member constructed to . . . " and should be construed to include equivalents for the structures disclosed. The use of expressions like: "critical", "preferred", "especially preferred" etc. is not intended to limit the invention. Additions, deletions, and modifications within the purview of the skilled person may generally be made without departing from the spirit and scope of the invention, as is determined by the claims. The invention may be practiced otherwise then as specifically described herein, and is only limited by the appended claims.

The invention claimed is:

1. A method of operating a scanning probe microscopy system for performing acoustic scanning probe microscopy for subsurface imaging using the scanning probe microscopy system, wherein the scanning probe microscopy system for performing acoustic scanning probe microscopy comprises a sample carrier for supporting a sample, a probe with a probe tip, a transducer, a sensor for sensing probe tip vibrations, and a controller, wherein the system is configured for positioning the probe tip relative to the sample;
   wherein the method of operating the scanning probe microscopy system comprises tuning parameter settings of the scanning probe microscopy system by:
   a) applying, by the transducer to the sample, an acoustic vibration signal comprising a first frequency and a second frequency;
   b) controlling, at a first position of the probe tip relative to the sample, the transducer to carry out a sweeping of the first frequency of the acoustic vibration signal across a first frequency range, and obtaining a first probe tip sensor signal using the sensor during the sweeping of the first frequency;
   c) controlling, at a second position of the probe tip relative to the sample, the transducer to carry out a sweeping of the first frequency of the acoustic vibration signal across at least said first frequency range, and obtaining a second probe tip sensor signal using the sensor during the sweeping of the first frequency; and
   d) analyzing, by the controller, the first probe tip sensor signal and the second probe tip sensor signal to obtain a difference characteristic dependent on the first frequency, and selecting a first frequency value for which the difference characteristic exceeds a threshold for tuning the first frequency;
   wherein the first position and the second position of the probe tip are selected such that a subsurface structure of the sample at the second position differs from a subsurface structure of the sample at the first position.

2. The method according to claim 1, wherein a setpoint setting of the system defines a force applied by the probe tip to a surface of the sample during sensing, wherein the method further comprises repeating b), c) and d) for a plurality of different setpoint settings, and
   for said selecting, for the tuning, a setpoint setting and an associated first frequency value for which the difference characteristic exceeds a threshold.

3. The method according to claim 1, further comprising:
   e) controlling, at said first position, the transducer to carry out a sweeping of the second frequency of the acoustic vibration signal across a second frequency range, and obtaining a third probe tip sensor signal using the sensor during the sweeping of the second frequency;
   f) controlling, at said second position, the transducer to carry out a sweeping of the second frequency of the acoustic vibration signal across at least said second frequency range, and obtaining a fourth probe tip sensor signal using the sensor during the sweeping of the second frequency; and g) analyzing, by the controller, the third probe tip sensor signal and the fourth probe tip sensor signal to obtain a difference characteristic dependent on the second frequency, and selecting a second frequency value for which the difference characteristic exceeds a threshold for tuning the second frequency.

4. The method according to claim 1, wherein b) and c) are performed by:

scanning the probe tip relative to the sample; and controlling, at a plurality of relative positions between the probe tip and the sample during the scanning the probe tip relative to the sample, the transducer to carry out a sweeping of the first frequency of the acoustic vibration signal across the first frequency range, and obtaining a probe tip sensor signal for each of the plurality of relative positions using the sensor during the sweeping of the first frequency;

further comprising identifying from the plurality of relative positions or the associated probe tip sensor signals, a first group of positions and a second group of positions such that the subsurface structure of the sample at the second group of positions is different from the subsurface structure of the sample at the first group of positions; and wherein d) is performed by analyzing, by the controller, the sensor signals associated with the first group of positions in relation to the sensor signals associated with the second group of positions to obtain the difference characteristic dependent on the first frequency, and selecting the first frequency value for which the difference characteristic exceeds the threshold for tuning of the first frequency.

5. The method according to claim 3, wherein e) and f) are performed by:

controlling, at said plurality of relative positions between the probe tip and the sample during said scanning, the transducer to carry out a sweeping of the second frequency of the acoustic vibration signal across the second frequency range, and obtaining a further probe tip sensor signal for each of the plurality of relative positions using the sensor during the sweeping of the second frequency; and wherein g) is performed by analyzing, by the controller, the sensor signals associated with the first group of positions in relation to the sensor signals associated with the second group of positions to obtain the difference characteristic dependent on the second frequency, and selecting the second frequency value for which the difference characteristic exceeds the threshold for tuning of the second frequency.

6. The method according to claim 5, wherein the sweeping of the second frequency at the plurality of relative positions between the probe tip and the sample, and obtaining the further probe tip sensor signal for each position is performed during a further scanning of the probe tip relative to the sample.

7. The method according to claim 4, wherein at least one of the scanning or the further scanning is performed by scanning in a first direction and scanning in a second direction, the second direction being a counter direction of the first direction.

8. The method according to claim 3, wherein the at least one difference characteristic obtained in either one or both d) and g) includes at least one element or a combination of elements of the group consisting of:

an amplitude difference between the first and second sensor signals, a phase difference between the first and second sensor signals, a Weber contrast value of the amplitude difference between the first and second sensor signal, and a value of the phase difference between the first and second sensor signal.

9. The method according to claim 1, wherein the first frequency range comprises frequencies between 10 Hz and 10 GHz.

10. Method according to any of the preceding claims, wherein the second frequency range comprises frequencies between 0 MHz and 300 MHz, preferably 1 MHz to 200 MHz, more preferably 2 MHz to 150 MHz.

11. The method of operating the scanning probe microscopy system of claim 1, wherein the method further comprises performing an acoustic scanning probe microscopy for subsurface imaging by:

scanning the probe tip relative to the sample;

applying, by the transducer to the sample, an acoustic vibration signal comprising a first frequency and a second frequency; and obtaining a responsive probe tip sensor signal using the sensor for providing an output signal for said subsurface imaging of the sample.

12. A scanning probe microscopy system configured for operation, including performing an automatic tuning of parameter settings of scanning probe microscopy system for acoustic scanning probe microscopy for subsurface imaging, wherein the scanning probe microscopy system comprises:

a sample carrier for supporting a sample, a probe with a probe tip, a transducer, a sensor for sensing probe tip vibrations, a memory, and a controller, wherein the system is configured for positioning the probe tip relative to the sample, and wherein the controller is configured for performing a method of operating the scanning probe microscopy system, wherein the method comprises tuning parameter settings of the scanning probe microscopy system by:

a) applying, by controlling the transducer to the sample, an acoustic vibration signal comprising a first frequency and a second frequency;

b) controlling, at a first position of the probe tip relative to the sample, the transducer to carry out a sweeping of the first frequency of the acoustic vibration signal across a first frequency range, and obtaining a first probe tip sensor signal using the sensor during the sweeping of the first frequency;

c) controlling, at a second position of the probe tip relative to the sample, the transducer to carry out a sweeping of the first frequency of the acoustic vibration signal across at least said first frequency range, and obtaining a second probe tip sensor signal using the sensor during the sweeping of the first frequency; and d) analyzing, by the controller, the first probe tip sensor signal and second probe tip sensor signal to obtain a difference characteristic dependent on the first frequency, and selecting a first frequency value for which the difference characteristic exceeds a threshold for tuning the first frequency;

wherein the controller is further configured for selecting the first position and the second position of the probe tip such that a subsurface structure of the sample at the second position differs from a subsurface structure of the sample at the first position.

13. The scanning probe microscopy system according to claim 12, wherein a setpoint setting of the system defines a force applied by the probe tip to a surface of the sample during sensing, and
wherein the controller is further configured for repeating b), c) and d) for a plurality of different setpoint settings, and for performing said tuning by selecting a setpoint setting and an associated first frequency value for which the difference characteristic exceeds the threshold.

14. The scanning probe microscopy system according to claim 12, wherein the controller is further configured for:
controlling, at said first position, the transducer to carry out a sweeping of the second frequency of the acoustic vibration signal across a second frequency range, and obtaining a third probe tip sensor signal using the sensor during the sweeping of the second frequency;
controlling, at said second position, the transducer to carry out a sweeping of the second frequency of the acoustic vibration signal across at least said second frequency range, and obtaining a fourth probe tip sensor signal using the sensor during the sweeping of the second frequency; and
analyzing, by the controller, the third and fourth sensor signal to obtain a difference characteristic dependent on the second frequency, and selecting a second frequency value for which the difference characteristic exceeds a threshold for tuning the second frequency.

15. A non-transitory computer-readable medium comprising computer-executable instructions for operating a controller of a scanning probe microscopy system for performing acoustic scanning probe microscopy, wherein the scanning probe microscopy system comprises a sample carrier for supporting a sample, a probe with a probe tip, a transducer, a sensor for sensing probe tip vibrations; wherein the system is configured for positioning the probe tip relative to the sample and wherein execution of the computer-executable instructions by the controller facilitates performing a method of operating the scanning probe microscopy system, wherein the method comprises tuning parameter settings of the scanning probe microscopy system
a) applying, by the transducer to the sample, an acoustic vibration signal comprising a first frequency and a second frequency;
b) controlling, at a first position of the probe tip relative to the sample, the transducer to carry out a sweeping of the first frequency of the acoustic vibration signal across a first frequency range, and obtaining a first probe tip sensor signal using the sensor during the sweeping of the first frequency;
c) controlling, at a second position of the probe tip relative to the sample, the transducer to carry out a sweeping of the first frequency of the acoustic vibration signal across at least said first frequency range, and obtaining a second probe tip sensor signal using the sensor during the sweeping of the first frequency; and
d) analyzing, by the controller, the first probe tip sensor signal and the second probe tip sensor signal to obtain a difference characteristic dependent on the first frequency, and selecting a first frequency value for which the difference characteristic exceeds a threshold for tuning the first frequency;

wherein the first position and the second position of the probe tip are selected such that a subsurface structure of the sample at the second position differs from a subsurface structure of the sample at the first position.

16. The non-transitory computer-readable medium according to claim 15, wherein a setpoint setting of the system defines a force applied by the probe tip to a surface of the sample during sensing, wherein the method further comprises repeating b), c) and d) for a plurality of different setpoint settings, and
selecting, for the tuning, a setpoint setting and an associated first frequency value for which the difference characteristic exceeds a threshold.

17. The non-transitory computer-readable medium according to claim 15, wherein the method further comprises:
e) controlling, at said first position, the transducer to carry out a sweeping of the second frequency of the acoustic vibration signal across a second frequency range, and obtaining a third probe tip sensor signal using the sensor during the sweeping of the second frequency;
f) controlling, at said second position, the transducer to carry out a sweeping of the second frequency of the acoustic vibration signal across at least said second frequency range, and obtaining a fourth probe tip sensor signal using the sensor during the sweeping of the second frequency; and
g) analyzing, by the controller, the third probe tip sensor signal and the fourth probe tip sensor signal to obtain a difference characteristic dependent on the second frequency, and selecting a second frequency value for which the difference characteristic exceeds a threshold for tuning the second frequency.

18. The non-transitory computer-readable medium according to claim 15, wherein b) and c) are performed by:
scanning the probe tip relative to the sample; and
controlling, at a plurality of relative positions between the probe tip and the sample during the scanning the probe tip relative to the sample, the transducer to carry out a sweeping of the first frequency of the acoustic vibration signal across the first frequency range, and obtaining a probe tip sensor signal for each of the plurality of relative positions using the sensor during the sweeping of the first frequency;
further comprising identifying from the plurality of relative positions or the associated probe tip sensor signals, a first group of positions and a second group of positions such that the subsurface structure of the sample at the second group of positions is different from the subsurface structure of the sample at the first group of positions; and
wherein d) is performed by analyzing, by the controller, the sensor signals associated with the first group of positions in relation to the sensor signals associated with the second group of positions to obtain the difference characteristic dependent on the first frequency, and selecting the first frequency value for which the difference characteristic exceeds the threshold for tuning of the first frequency.

19. The non-transitory computer-readable medium according to claim 17, wherein e) and f) are performed by:
controlling, at said plurality of relative positions between the probe tip and the sample during said scanning, the transducer to carry out a sweeping of the second frequency of the acoustic vibration signal across the second frequency range, and obtaining a further probe tip sensor signal for each of the plurality of relative positions using the sensor during the sweeping of the second frequency; and wherein g) is performed by analyzing, by the controller, the sensor signals associated with the first group of positions in relation to the sensor signals associated with the second group of positions to obtain the difference characteristic dependent on the second frequency, and selecting the second frequency value for which the difference characteristic exceeds the threshold for tuning of the second frequency.

20. The non-transitory computer-readable medium according to claim 19, wherein the sweeping of the second frequency at the plurality of relative positions between the probe tip and the sample, and obtaining the further probe tip sensor signal for each position is performed during a further scanning of the probe tip relative to the sample.

* * * * *